Feb. 4, 1936.  A. G. F. WALLGREN ET AL  2,029,600

BEARING

Filed Feb. 26, 1934

INVENTORS
August Glennar Ferdinand Wallgren
Carl Gustaf Janson
BY
their ATTORNEY Patented Feb. 4, 1936

2,029,600

UNITED STATES PATENT OFFICE 2,029,600

BEARING

August Gunnar Ferdinand Wallgren and Carl Gustaf Janson, Stockholm, Sweden, assignors to Aktiebolaget Nomy, Stockholm, Sweden, a corporation of Sweden Application February 26, 1934, Serial No. 712,966
In Germany March 3, 1933

22 Claims. (Cl. 308—73)

Our invention relates to bearings and particularly to bearings especially intended to carry a radial load and also capable of sustaining an axial or thrust load. A bearing of this general type is shown in U. S. Patent No. 1,871,485 issued August 16, 1932, to A. G. F. Wallgren. The bearing disclosed in this patent comprises a rotating inner ring member which carries a plurality of blocks formed with spherical load-transmitting surfaces. The surfaces of these blocks cooperate with a similar spherical surface formed in an outer stationary ring. Due to the fact that the load-transmitting surfaces are spherical the bearing is capable of transmitting a certain amount of axially directed load.

If a bearing of this type is employed for supporting a shaft which is subject to expansion and contraction due to temperature changes, it is necessary that the bearing is so arranged and constructed that it is capable of limited axial displacement. In copending application U. S. Serial No. 612,447, filed May 20, 1932, by A. G. F. Wallgren, Patent No. 1,995,408, issued March 26, 1935, there is disclosed a bearing which may be displaced axially by reason of the fact that the outer bearing member is so constructed as to roll slightly in an axial direction. This, in conjunction with the spherical bearing surfaces which permit universal movement between the outer ring and the rest of the bearing, results in the bearing being displaced slightly upon an expansion of the shaft without altering the alignment of the shaft. In order to prevent undesired rolling of the outer ring in the bearing housing, resilient means between the outer ring and the housing are provided which tend to maintain the outer ring in its normal position.

The object of the present invention is to provide an improved means for maintaining the outer ring in its normal position. This is accomplished, in accordance with the invention, by forming the outer surface of the outer bearing ring which rolls in the bearing housing, of such shape that rolling movement of the ring from a normal position results in a slight displacement in radial, as well as axial, direction of the center of the bearing. Consequently, if the bearing is used, for instance, in conjunction with a horizontal shaft, this radial displacement lifts the shaft and the weight of the shaft tends to return the outer ring to its normal position. The radial displacement of the shaft is so slight as to have no adverse effect on the shaft alignment.

In practice, it has been found advantageous to employ resilient means, as disclosed in said Patent No. 1,995,408, in combination with an outer ring having a supporting surface formed in the manner above indicated.

Further objects and advantages of our invention will be apparent from the following description considered in connection with the accompanying drawing which forms a part of this specification and of which:

Figure 1:
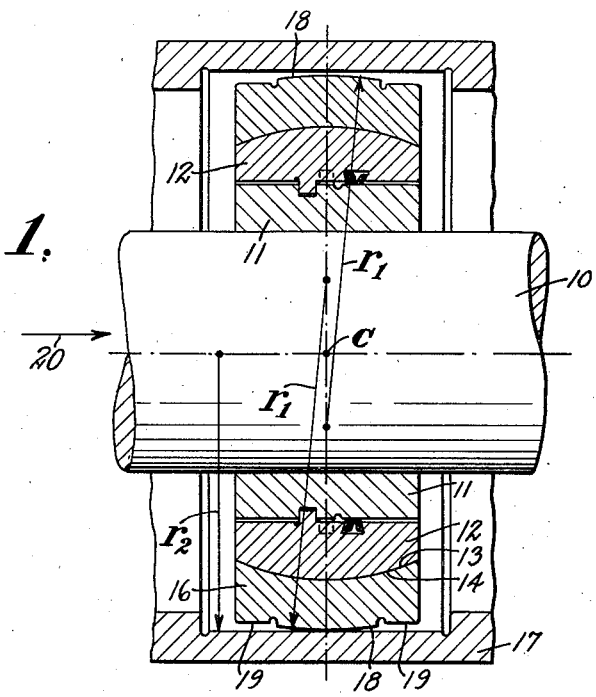
Fig. 1 is a cross-sectional view of one embodiment of our invention.

Referring more particularly to Fig. 1, reference character 10 designates a rotatable shaft. Fixed to shaft 10 in any suitable manner is an inner bearing ring 11. Ring 11 carries in rotation therewith a plurality of load-transmitting elements or bearing blocks 12. Blocks 12 are formed with spherical bearing surfaces 13 which are struck about the center point c of the bearing. The spherical surfaces of blocks 12 cooperate with a spherical surface 14 formed on the inner periphery of an outer bearing ring member 16. The spherical surface 14 is likewise struck about the center c. Blocks 12 have slight peripheral movement with respect to the ring 11 and may tip slightly with respect thereto in order that wedge-shaped spaces may be formed between the spherical surfaces of the blocks and the spherical surface of the outer ring 16. These wedge-shaped surfaces permit the formation therein of oil films between the bearing surfaces, as is described in full detail in the above referred to U. S. Patent No. 1,871,485.

The fact that blocks 12 and ring 16 are provided with spherical surfaces struck about the center of the bearing permits the ring 16 to have universal movement with respect to the rest of the bearing.

Ring 16 is supported within a fixed bearing housing 17, or other suitable support. A portion of the outer periphery of ring 16 is formed as a supporting surface 18. This surface is not spherical as is the case in Patent No. 1,995,408 above referred to. On the contrary, as is shown in Fig. 1, the curvature of this surface in a plane of the axis of the bearing (the plane of the paper in the figure) has a radius $r_1$ which is greater than the radius $r_2$ of the outer surface of the outer ring 16 in a plane normal to the axis. Another way of describing the surface 18 is to state that it is a surface of revolution produced by revolving an arc, the radius of the arc ($r_1$) being greater than the radius ($r_2$) of the circular path through which it is revolved. It is not necessary that the above referred to arc is the arc of a circle, but it might be the arc of any curve such as an ellipse the major axis of which extends in axial direction, in which case the surface 18 would be an ellipsoid of revolution. Whether it is the arc of a circle of any other curve, the rate of curvature of the arc is less than the rate of curvature of the circular path through which it is revolved.

It will be noted that the internal diameter of the housing 17 is slightly greater than the external diameter of the outer ring 16 in order that the outer ring may have free rolling movement on its loaded side (normally the bottom). Axially on either side of the surface 18, the outer ring 16 is formed with substantially cylindrical surfaces 19 of less radius than the radius $r_2$ of the center of the surface 18. One or the other of the surfaces 19 will act to limit the rolling in an axial direction of the outer ring 16. Consequently, the ring 16 cannot be tipped obliquely with respect to the rest of the bearing beyond the desired position. This makes it possible for the bearing to sustain a thrust load of the nature exerted by a gear train, while permitting the bearing to be displaced slightly in the event of shaft expansion or contraction.

When subjected to a thrust load the bearing operates in the following manner: A thrust acting in the direction of the arrow 20 will be transmitted from the shaft through the inner ring 11 and the blocks 12 to the outer ring 16. Transmission of thrust from the blocks to the outer ring takes place by virtue of the fact that their cooperating surfaces are spherical. This thrust tends to displace the ring 16 to the right. Due to the fact that the ring is supported in the housing 17 only at its lower or loaded portion, the ring will roll slightly with respect to the housing. Consequently, it will take a position slightly oblique with respect to the shaft and the rest of the bearing, namely, ring 11, blocks 12 and housing 17 by virtue of the fact that it may have universal movement with respect to the blocks. This slight rolling of the outer ring 16 displaces the center $c$ of the bearing slightly to the right, thus allowing for expansion of the shaft 10 in the event that the thrust was caused by an expansion of the shaft.

Due to the fact that the radius $r_1$ is greater than the radius $r_2$, the above described rolling of the outer ring 16 will cause the center $c$ of the bearing to be displaced radially upwards as well as axially to the right. This lifts the shaft 10 and consequently the weight of the shaft tends to return the ring 16 to a normal position. This assures that the ring 16 will not remain in an oblique position unintentionally when the bearing is not sustaining a thrust load. If no provision were made for tending to return the outer ring to a normal position, the bearing might operate with the ring in an oblique position even though no thrust load was imposed thereon if, for instance, the bearing was originally set up with the outer ring slightly oblique.

Figure 2:
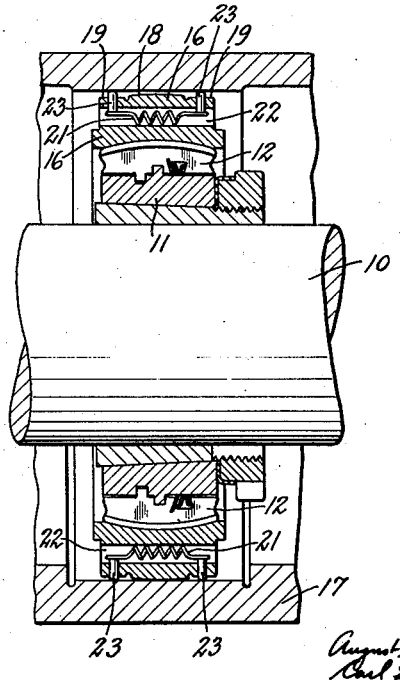
Fig. 2 is a cross-sectional view of a preferred embodiment of our invention wherein the outer ring is formed as above pointed out and is used in combination with resilient means between the ring and the housing.

The bearing illustrated in Fig. 2 is substantially the same as shown in Fig. 1 with the exception that resilient means comprising springs 21 are also provided for tending to maintain the outer ring 16 in a normal position. In this embodiment the outer ring 16 is formed with a plurality of axially extending passages 22 in which are located the springs 21. Reciprocable members 23 are located in radial openings which extend from the passages 22 to the outer periphery of the ring in the neighborhood of surfaces 19. The outer ends of members 23 are forced against the housing 17 by the springs 21 which contact their inner ends.

Consequently, when the ring 16 is tipped due to an axial thrust the members 23 at one end of the bearing are forced inwardly against the action of springs 21. Therefore, these springs tend to retain the ring 16 in a normal position. This tendency aids the similar tendency produced by the slight displacement in a radial direction of the center of the bearing due to the shape of the surface 18 of the ring 16, as was explained in detail in connection with Fig. 1. It has been found in practice that this combination results in an excellent operation of the bearing.

While we have described two more or less specific embodiments for our invention, it is to be understood that these are for purposes of illustration only and that the scope of our invention is to be limited only by the appended claims viewed in the light of the prior art.

What we claim is:

1. Bearing structure comprising an inner rotating member, an outer rotationally stationary member universally movable with respect to said inner member, and a fixed member for supporting said outer member, said outer member and said fixed member having cooperating surfaces including a curved surface on said outer member for causing the axis of rotation of the bearing to be displaced radially with respect to said fixed member in a direction away from said cooperating surfaces upon movement of said outer member from a plane normal to said axis.

2. Bearing structure comprising radially spaced circular inner and outer bearing members, a plurality of load-transmitting elements between said members, and an outer casing member, one of said bearing members having surface curved to permit universal movement of the outer bearing member with respect to the axis of rotation of the bearing, and said outer bearing member and said outer casing member having cooperating surfaces including a curved surface for causing the axis of rotation of the bearing to be displaced radially with respect to said outer casing member in a direction away from said cooperating surfaces upon movement of said outer bearing member from a plane normal to said axis.

3. Bearing structure comprising relatively rotatable circular inner and outer bearing members, said members being radially spaced, bearing elements for transmitting load between said members, and an outer casing member having an inner surface curved in a plane normal to the axis of the bearing encircling said outer bearing member, said outer bearing member having an outer surface curved in the plane of the axis of the bearing and the radius of curvature of said outer surface being greater than the radius of curvature of the inner surface of said casing member, whereby to cause displacement of the axis of the bearing radially with respect to said inner surface upon movement of said outer bearing member to a position oblique with respect to said axis.

4. Bearing structure comprising an inner rotary member, a plurality of bearing elements adjacent to said rotary member, an outer member having an inner spherical bearing surface adjacent to said elements and universally movable with respect to said elements, and a stationary member around said outer member, said outer member and said stationary member having cooperating surfaces permitting movement of said outer member angularly with respect to a plane normal to the axis of rotation, the cooperating surface of said outer member being a surface of revolution formed by revolving an arc, the radius of the arc being greater than the radius about which it is revolved.

5. Bearing structure comprising an inner rotary member, a plurality of bearing elements adjacent to said rotary member, an outer member having an inner spherical bearing surface adjacent to said elements and universally movable with respect to said elements, and a stationary member around said outer member, said outer member and said stationary member having cooperating surfaces permitting movement of said outer member angularly with respect to a plane normal to the axis of rotation, the cooperating surface of said outer member being a surface of revolution formed by revolving an arc, the rate of curvature of said arc being less than the rate of curvature of the circular path through which it is revolved.

6. Bearing structure comprising an inner rotary member, a plurality of bearing elements adjacent to said rotary member, an outer member having an inner spherical bearing surface adjacent to said elements and universally movable with respect to said elements, and a stationary member around said outer member, said outer member and said stationary member having cooperating surfaces permitting movement of said outer member angularly with respect to a plane normal to the axis of rotation, the cooperating surface of said outer member being substantially a section of an ellipsoid of revolution having its major axis extending substantially axially of the bearing.

7. Bearing structure comprising an inner rotating member, an outer rotationally stationary member universally movable with respect to said inner member, a fixed member for supporting said outer member, said outer member having a curved surface contacting said fixed member such that angular movement of said outer member with respect to said fixed member resulting from axial displacement of said inner member causes displacement of said inner member in a radial direction, and resilient means for resisting angular movement of said outer member.

8. Bearing structure comprising radially spaced circular inner and outer bearing members, a plurality of load-transmitting elements between said members, an outer casing member, one of said bearing members having surfaces curved to permit universal movement of the outer bearing member with respect to the axis of rotation of the bearing, said outer bearing member and said outer casing member having cooperating surfaces including a curved surface for causing the axis of rotation of the bearing to be displaced radially with respect to said outer casing member upon movement of said outer bearing member from a plane normal to said axis, and resilient means between said outer bearing member and said outer casing member for resisting said movement of said outer bearing from a plane normal to said axis.

9. Bearing structure comprising relatively rotatable circular inner and outer bearing members, said members being radially spaced, bearing elements for transmitting load between said members, an outer casing member having an inner surface curved in a plane normal to the axis of the bearing encircling said outer bearing member, said outer bearing member having an outer surface curved in the plane of the axis of the bearing and the radius of curvature of said outer surface being greater than the radius of curvature of the inner surface of said casing member, whereby to cause displacement of the axis of the bearing radially with respect to said inner surface upon movement of said outer bearing member to a position oblique with respect to said axis, and resilient means for resisting movement of said outer bearing member to an oblique position.

10. Bearing structure comprising an inner rotary member, a plurality of bearing elements adjacent to said rotary member, an outer member having an inner spherical bearing surface adjacent to said elements and universally movable with respect to said elements, a stationary member around said outer member, said outer member and said stationary member having cooperating surfaces permitting movement of said outer member angularly with respect to a plane normal to the axis of rotation, the cooperating surface of said outer member being a surface of revolution formed by revolving an arc, the radius of the arc being greater than the radius about which it is revolved, and resilient means between said outer member and said stationary member for resisting the angular movement of said outer member.

11. Bearing structure comprising an inner rotary member, a plurality of bearing elements adjacent to said rotary member, an outer member having an inner spherical bearing surface adjacent to said elements and universally movable with respect to said elements, a stationary member around said outer member, said outer member and said stationary member having cooperating surfaces permitting movement of said outer member angularly with respect to a plane normal to the axis of rotation, the cooperating surface of said outer member being a surface of revolution formed by revolving an arc, the rate of curvature of said arc being less than the rate of curvature of the circular path through which it is revolved, and resilient means between said outer member and said stationary member for resisting the angular movement of said outer member.

12. Bearing structure comprising an inner rotary member, a plurality of bearing elements adjacent to said rotary member, and an outer member having an inner spherical bearing surface adjacent to said elements and universally movable with respect to said elements, said outer member being formed with an outer surface which is a surface of revolution formed by revolving an arc, the rate of curvature of said arc being less than the rate of curvature of the circular path through which it is revolved.

13. Bearing structure comprising an inner rotary member, a plurality of bearing elements adjacent to said rotary member, and an outer member having an inner spherical bearing surface adjacent to said elements and universally movable with respect to said elements, said outer member being formed with an outer surface which is a surface of revolution formed by revolving an arc, the radius of the arc being greater than the radius of the circular path through which it is revolved.

14. Bearing structure comprising an inner rotary member, a plurality of bearing elements adjacent to said rotary member, and an outer member having an inner spherical bearing surface adjacent to said elements and universally movable with respect to said elements, said outer member being formed with an outer surface which is substantially a section of an ellipsoid of revolution having its major axis extending substantially axial of the bearing.

15. Bearing structure comprising an inner rotating member, an outer rotationally stationary member universally movable with respect to said inner member, and a fixed member for supporting said outer member, said outer member and said fixed member having cooperating surfaces including a curved surface for causing the axis of rotation of the bearing to be displaced radially with respect to said fixed member in a direction away from said cooperating surfaces upon movement of said outer member from a plane normal to said axis.

16. In a bearing for supporting a rotatable shaft, an inner bearing member adapted to be rigidly secured to the shaft, an outer bearing member radially spaced therefrom and a plurality of load-transmitting elements between said members, one of said bearing members having surface curved to permit universal movement of the outer bearing member with respect to the axis of the shaft, said outer bearing member having a supporting surface adapted to cooperate with the inner surface of a bearing housing and said supporting surface being so curved as to cause the shaft to be displaced radially away from the cooperating surfaces upon the movement of said outer bearing member from a plane normal to the axis of the shaft.

17. In a bearing for supporting a rotatable shaft, an inner bearing member adapted to be rigidly secured to the shaft, an outer bearing member radially spaced therefrom, and a plurality of load-transmitting elements between said members, one of said bearing members having surface curved to permit universal movement of the outer bearing member with respect to the axis of the shaft, said outer bearing member having a supporting surface adapted to cooperate with the inner surface of a bearing housing and said supporting surface being a surface of revolution formed by revolving an arc, the radius of the arc being greater than the radius of the circular path through which it is revolved.

18. In a bearing for supporting a rotatable shaft, an inner bearing member adapted to be rigidly secured to the shaft, an outer bearing member radially spaced therefrom, and a plurality of load-transmitting elements between said members, one of said bearing members having surface curved to permit universal movement of the outer bearing member with respect to the axis of the shaft, said outer bearing member having a supporting surface adapted to cooperate with the inner surface of a bearing housing and said supporting surface being a surface of revolution formed by revolving an arc, the rate of curvature of said arc being less than the rate of curvature of the circular path through which it is revolved.

19. Bearing structure comprising an inner rotating member, an outer rotationally stationary member universally movable with respect to said inner member, and means for supporting said outer member, said means and said outer member having cooperating surfaces including a curved surface for causing the axis of rotation of the bearing to be displaced radially with respect to said means in a direction away from said cooperating surfaces upon movement of said outer member from a plane normal to said axis.

20. Bearing structure comprising an inner rotating member, an outer rotationally stationary member universally movable with respect to said inner member, and a fixed member for supporting said outer member, said outer member having a curved surface adapted to have rolling movement with respect to a surface on said fixed member upon axial displacement of said inner member, said curved surface cooperating with the surface on said fixed member for causing the axis of rotation of the bearing to be displaced radially with respect to said fixed member upon rolling movement of said outer member.

21. Bearing structure comprising an inner rotating member, an outer rotationally stationary member universally movable with respect to said inner member, and a fixed member for supporting said outer member, said outer member having a curved surface adapted to contact and have rolling movement on a surface on said fixed member upon axial displacement of said inner member, said curved surface cooperating with the surface on said fixed member for causing the axis of rotation of the bearing to be displaced radially with respect to said fixed member in a direction away from said cooperating surfaces upon rolling movement of said outer member.

22. In a bearing for supporting a horizontal shaft, an inner bearing member adapted to be rigidly secured to the shaft, an outer rotationally stationary member universally movable with respect to said inner member, and a fixed member for supporting said outer member, said outer member and said fixed member having cooperating surfaces including a curved surface for causing the axis of rotation of the bearing to be displaced upwardly upon movement of said outer member from a plane normal to said axis.

AUGUST GUNNAR FERDINAND WALLGREN.
CARL GUSTAF JANSON.